United States Patent [19]

Markham

[11] 4,348,682

[45] Sep. 7, 1982

[54] LINEAR INK JET DEFLECTION METHOD AND APPARATUS

[75] Inventor: Roger G. Markham, Webster, N.Y.

[73] Assignee: Xerox Corporation, Stamford, Conn.

[21] Appl. No.: 275,090

[22] Filed: Jun. 19, 1981

[51] Int. Cl.³ .................. G01D 15/18; G01D 18/00

[52] U.S. Cl. .................................. 346/1.1; 346/75

[58] Field of Search .................... 346/1.1, 75, 140; 250/396, 398

[56] References Cited

U.S. PATENT DOCUMENTS

| | | | |
|---|---|---|---|
| 3,579,245 | 5/1971 | Berry | 346/1.1 |
| 3,689,693 | 9/1972 | Cahill et al. | 346/75 X |
| 3,959,797 | 5/1976 | Jensen | 346/75 X |
| 3,992,712 | 11/1976 | Dill et al. | 346/75 X |
| 4,012,745 | 3/1977 | Brown et al. | 346/1.1 |
| 4,063,252 | 12/1977 | Jensen et al. | 346/75 |
| 4,078,238 | 3/1978 | Lee | 346/75 |
| 4,122,458 | 10/1978 | Paranjpe | 346/75 |
| 4,123,760 | 10/1978 | Hou | 346/75 X |
| 4,223,318 | 9/1980 | Bogardus | 346/75 |
| 4,224,523 | 9/1980 | Crean | 346/75 |
| 4,274,100 | 6/1981 | Pond | 346/75 X |

*Primary Examiner*—Donald A. Griffin

[57] ABSTRACT

An ink jet recorder of the type where ink from a plurality of nozzles is directed to a record medium for encoding of information onto said medium. The recorder includes scanning electrodes which deflect ink columns formed through the nozzles from side to side so each nozzle throws ink to a selected portion of the medium. At the point of ink droplet formation, charging electrodes induce either a positive or negative charge on each ink droplet. A quadrapole field generating electrode located intermediate the charging electrode and the record member deflects the charged droplets according to a scheme whereby the side to side scanning of positively charged droplets is amplified and negatively charged droplets are guttered and recirculated for reuse by the recorder.

11 Claims, 9 Drawing Figures

LINEAR INK JET DEFLECTION METHOD AND APPARATUS

BACKGROUND OF THE INVENTION

1. Field of the Invention

This invention relates to ink jet technology, and more particularly to method and apparatus for controlling the trajectory of a continuous stream of ink droplets in their path to a recording medium.

2. Prior Art

In one form of ink jet printing, conductive fluid is delivered under pressure from a cavity through an orifice in the form of a continuous stream. Perturbation is applied to the ink in the cavity, such as for example, by periodic excitation of a piezoelectric crystal mounted within the cavity. This excitation causes the continuous stream flowing through the orifice to break up into substantially uniform drops which are uniformly spaced from one another. At the point of drop formation, drop charge electrodes coupled to control circuitry for applying specific voltages induce a charge upon the drops. Selective deflection of the drops is then achieved by passing them through an electric field created by deflection electrodes having a voltage sufficient to cause an appreciable drop deflection. The electric field generated by the electrodes selectively deflects the charged drop to a predetermined position on a recording medium or to a gutter which is coupled to the cavity and is utilized to recycle those ink droplets not directed to the recording medium.

A number of ink jet geometries have been proposed to encode information on a record medium such as a sheet of paper. In a typical ink jet configuration ink droplets are selectively transmitted to the sheet of paper a row at a time and the sheet is moved in relation to the ink jet generator so that subsequent rows may be encoded with information. The longitudinal movement between paper and ink jet generator may, for example, be achieved by mounting the paper to a rotating support drum which causes the paper to move past the generator.

According to one ink jet technique, a single jet nozzle sweeps or scans back and forth across the paper at a high rate of speed, depositing ink in both directions of the scan. A system embodying a single ink jet nozzle must include apparatus to accurately accelerate and decelerate that nozzle for each row of the scan. Use of a single ink jet nozzle places an upper limit on the speed with which the paper can be moved past the generator.

One proposed solution to the speed constraint imposed by the single ink jet geometry requires a 1:1 correspondence between the number of ink jet nozzles and the number of pixels or incremental areas of coverage across the width of paper. These multiple nozzles are stationary with respect to the paper and, therefore, require no controlled accelerations. A problem encountered with this ink jet geometry is the close spacing required to achieve a high resolution encoding of ink onto the paper. The ink jet charging and deflecting circuitry must also be closely spaced. This geometry becomes untenable for any system requiring high resolution.

The problems encountered with the single nozzle and 1:1 geometries discussed above have led to the proposal of an ink jet system having multiple ink jet nozzles which are spaced apart and thereby supply ink droplets to multiple pixels in a given scanning row. Choice of this intermediate geometry requires some mechanism or technique for providing complete coverage across a given row of pixels. One technique for providing this coverage is proposed in U.S. Pat. No. 3,689,693 to Cahill et al. entitled "Multiple Head Ink Drop Graphic Generator." Apparatus constructed in accordance with the '693 patent requires transverse or side to side scanning of the multiple ink jets so that each jet is responsible for sending ink droplets to a number of pixels in a given row. The vertical movement of the paper with respect to the ink jet nozzles may be intermittent or continuous. If the movement is intermittent, each ink jet sweeps across its entire segment of coverage before the paper is stepped to a new position. In a continuous motion system the paper is mounted to a rotating drum and each jet sweeps off a spiralling trajectory, moving sideways one pixel per drum revolution.

A somewhat different approach for a multiple jet spaced apart ink jet system is proposed in U.S. Pat. No. 4,274,100 to Stephen F. Pond entitled "Electrostatic Scanning Ink Jet Method and Apparatus" which was filed in the U.S. Pat. Office on Oct. 4, 1978. The Pond patent is incorporated herein by reference. The apparatus described in that patent includes a series of spaced multiple ink jets which provide complete scanning coverage across a given row of pixels on the record medium without requiring side to side movement of the multiple ink jet nozzles. Each ink jet has associated with it a number of charging and deflection elements which interact with an ink drop to control its trajectory. Of particular note is the utilization of a control electrode or electrodes which repetitively cause a given ink jet to scan in a horizontal direction across a portion of a width of the record medium. Use of multiple ink jets provides coverage for an entire row. This ink deflection is provided prior to the breakup into individual drops and once break up does occur the drops are charged to an appropriate level, so that a deflection electrode can be used to controllably direct those drops either to the record member or to a gutter.

The apparatus disclosed in the Pond patent represents a significant advance over the art. An entire row of pixels on the record member can be selectively encoded with information without moving the plurality of spaced ink jets in relation to the sheet of paper. Practice of the invention disclosed in the Pond patent is not achieved without a certain degree of complexity. Care must be taken in applying control voltages to the electrodes to ensure that each of the multiple ink jets cover its designated region across the width of paper without overlapping its next closest neighbor and also without leaving gaps between areas of coverage. The process ensuring complete coverage across the width of the sheet of paper is known in the art as stitching.

A second U.S. patent application entitled "Linear Ink Jet Deflection Method and Apparatus" to Torpey, U.S. Ser. No. 251,405 relates to an improved circuit for controlling the lateral deflection of the ink column in a Pond type ink jet apparatus. According to the technique disclosed in the Torpey apparatus, two electrodes spaced on opposite sides of an ink jet column deflect the column. By control of the voltages applied to these oppositely positioned electrodes, the angle of ink jet column deflection has been made proportional to a control voltage applied to the electrodes. This proportionality facilitates control over column scanning to insure proper stitching together of ink droplets from a plurality of ink jet nozzles in such a system.

The present invention relates to an improvement in the Pond type ink jet configuration which includes a focusing/defocusing electrode which deflects charged ink droplets subsequent to ink passage past the column deflection electrode. Use of an electrode positioned downstream from a point of droplet breakoff to focus charged droplets is not new. U.S. Pat. No. 4,224,523 to Crean, for example, shows a focusing "lens" which deflects or focuses charged droplets to a common fuel focal line on a recording medium. The Crean apparatus was not used in a Pond type system. It was used to compensate for misdirected jet columns and not for controlled scanning of droplets to the plane of the recording medium.

SUMMARY OF THE INVENTION

The present invention discloses use of a novel ink jet electrode configuration positioned about a path of droplet travel subsequent to drop breakoff which amplifies the side to side scanning process initiated by a column scan electrode. In addition to amplifying the side to side deflection the present electrode configuration directs selected droplets into a gutter or ink droplet diverter for recycling of those droplets.

An ink jet printer constructed in accordance with the present invention comprises an electric field generating electrode having pairs of electric field altering members extending along opposite sides of a drop flight path. The electric field focuses droplets along a first direction and diverges or displaces those same droplets along a second or transverse direction.

A preferred electrode configuration generates a quadrapole electric field which deflects both positively and negatively charged droplets. The electrodes defining the quadrapole field surround a center line or axis which provides a convenient reference point for describing the operation of the invention. The position of a given droplet in relation to that center line can be defined in terms of a two dimensional coordinate system having an origin coincident with the center line and whose axes bisect the quadrapole electrodes. A displacement from the center line away from the two axes results in a charged droplet being both attracted back toward center line along a first direction and repulsed from the center line along a perpendicular direction. Stated another way, displacement from the center line results in a focusing along one direction and a defocusing or deflecting along the second perpendicular direction. These deflections are used to particular advantage in a Pond type ink jet system.

In accordance with a preferred embodiment, the orientation of the field generating electrodes is chosen such that deflections initiated by the scan electrodes are amplified so that the amount of deflection initiated by the scan electrodes need not sweep the entire allotted paper width. This scan enhancement takes advantage of the so-called defocusing or deflecting properties of the field generating electrodes. In the orthogonal direction to this defocusing, droplets directed to the paper are focused toward the center axis so that a slight misdirection of droplets in the direction of paper movement does not unduly disrupt the uniformity of drop placement across the width of a scan line. This focusing effect is similar to that disclosed in the Crean patent.

The preferred quadrapole electric field interacts differently with positively and negatively charged ink droplets. If a positive charged droplet responds in the above described manner, a negatively charged particle will be directed away from the paper to a gutter or droplet diverter system. The focusing effort for the negatively charged droplet causes that droplet to strike the gutter near the center of droplet path, i.e. either directly above or directly below the center axis.

As will be seen in conjunction with the description of the preferred embodiment, the field generating electrode configuration can be modified slightly to focus and defocus charged droplets in a slightly different way. In particular, it will be shown how relative movement between the paper and the ink jet generator can be taken into account so that ink droplets from a given scan strike the paper in substantially horizontal positions rather than a skewed line which might be expected due to relative movement between paper and generator.

From the above it should be appreciated that one object of the invention is the creation of an electric field between an ink jet scan electrode and a paper path which selectively focuses and defocuses charged ink droplets in their path between the ink jet generator and the paper plane. Other objects, advantages and features of the present invention will become better understood when a detailed description of a preferred embodiment of the invention is considered in conjunction with the accompanying drawings.

Figure 1:
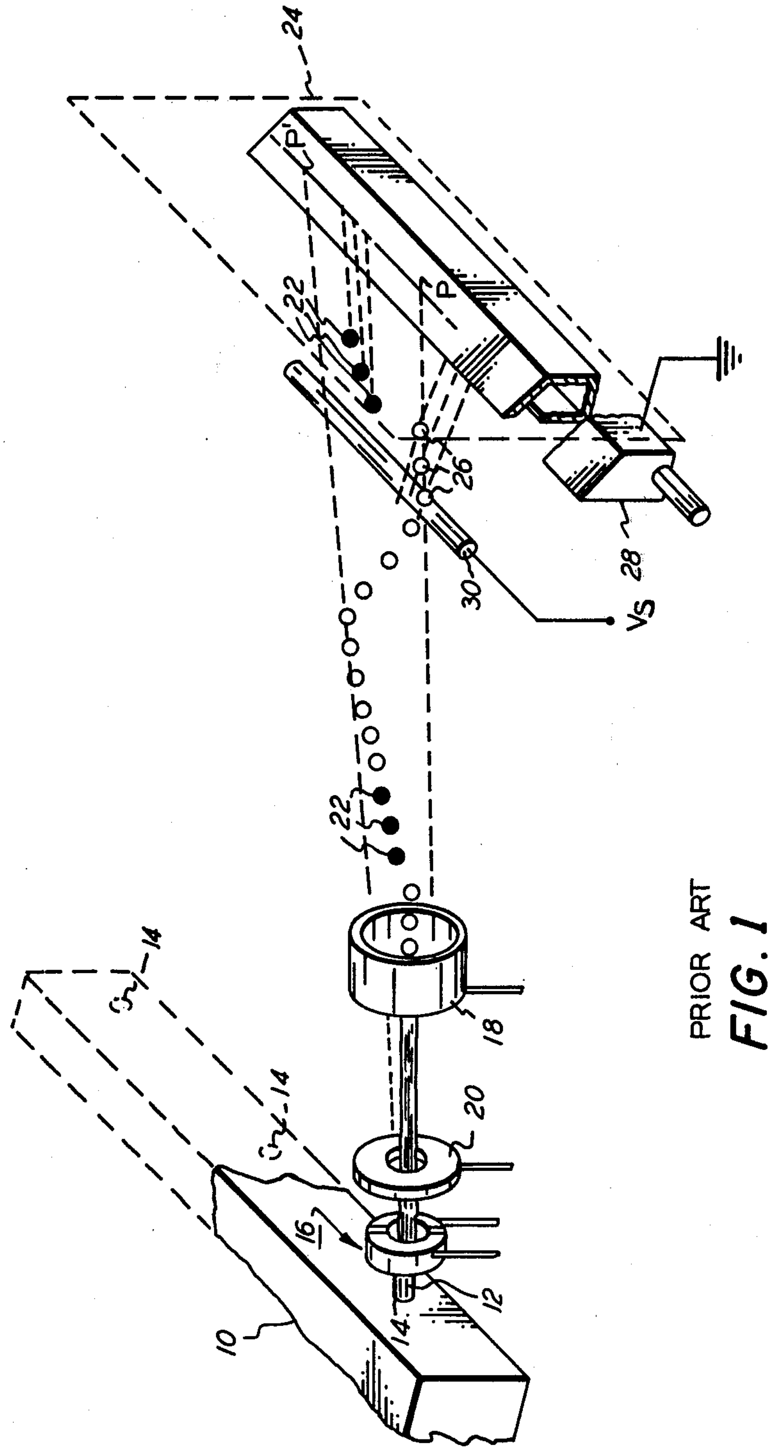
PRIOR ART FIG. 1
FIG. 1 is a perspective schematic view of a prior art scanning type ink jet system.

Referring now to the drawings, and in particular, FIG. 1, there is shown a prior art ink jet scanning system comprising a droplet generator 10 which forces a column 12 of ink from a nozzle 14. While a single ink jet nozzle is illustrated in that figure, it should be appreciated to those skilled in the art that a typical system comprises a series of nozzles for generating parallel ink jet columns which are directed to a recording medium such as paper or the like. Ink droplets from the plurality of nozzles are then "stitched" together to provide ink jet recording capability across the entire paper width. The prior art system illustrated in FIG. 1 is similar to the scanning ink column system disclosed in the above referenced and incorporated Pond patent. In particular, the system includes a scanning electrode 16 and means for coupling that electrode 16 to a source of electric potential for causing the column 12 to scan from side to side as ink is forced from the nozzle. After passing the scanning electrode 16, the column 12 breaks up into individual droplets in the vicinity of the charging electrode 18. To insure that droplets in the vicinity of the charging electrode do not carry an induced charge generated by the scanning electrode 16, a grounded electrode 20 is interposed between charging and scanning electrodes.

The charging electrode 18 in a Pond type prior art scanning system functions to selectively charge the ink droplets from the generator 10 according to a scheme whereby positively charged droplets 22 are directed to a paper plane 24 and negatively charged droplets 26 are directed to a recirculating gutter 28. Coordination of the side to side scanning produced by the scanning electrode 16 and the charging induced by the charging electrode 18 makes it possible to direct selected ones of the droplets generated by the generator 10 to specified locations in the paper plane 24. The charged droplets next travel past a positively charged bipolar electrode 30 which attracts the negatively charged droplets 26 to deflect them into the gutter 28 and repulses the positively charged droplets allowing them to travel to the paper plane. In the prior art system illustrated in FIG. 1, the side to side scan produced by the scanning electrode 16 is delineated by the paper plane positions labeled P and P'. Further details regarding this prior art scanning ink jet system can be obtained by referring to the above-referenced and incorporated Pond patent.

With regard to the prior art systems disclosed in FIG. 1, it should be emphasized that all side to side scanning of the positively charged droplets which are to be directed to the paper plane is achieved by application of control voltages to the scanning electrode 16. It should also be recalled and emphasized that the bipolar electrode 30 is required to divert a negatively charged droplet away from the paper plane into the gutter 28 so that only selected portions of the paper plane receive ink droplet coverage.

Figure 2:
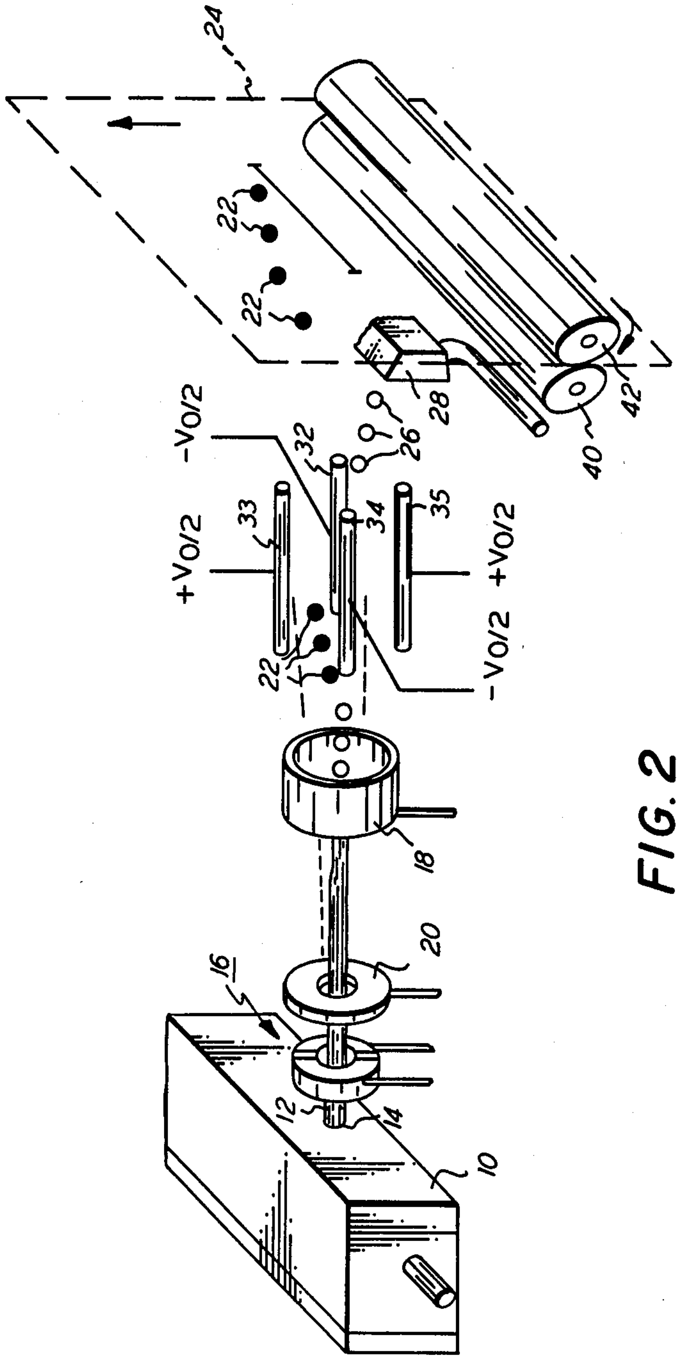
FIG. 2 is a perspective schematic view of an ink jet system constructed in accordance with the present invention.
Figure 3:
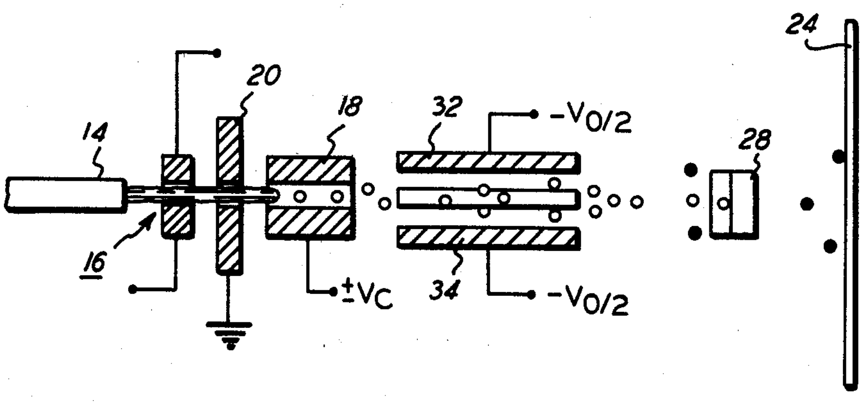
FIGS. 3 and 4 are partially setioned top and elevation views of the FIG. 2 system.
Figure 4:
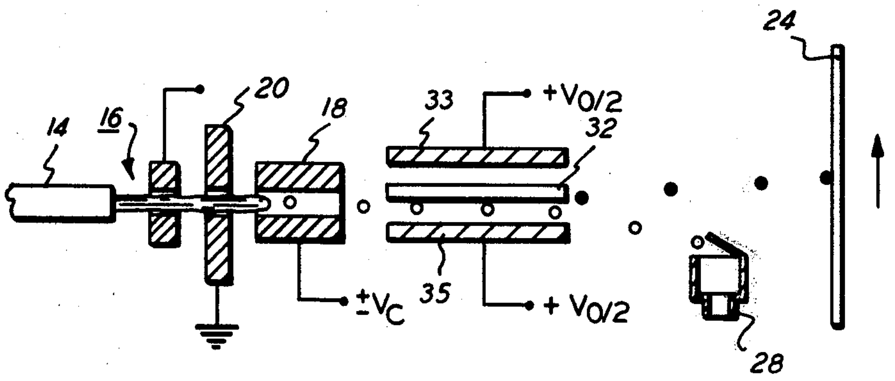

The improved scan type ink jet configuration illustrated in FIG. 2 is in some respects similar to the prior art system discussed above. An ink jet system constructed in accordance with the present invention comprises an ink jet generator 10, scan electrode 16, grounding electrode 20 and charging electrode 18. These components perform substantially identical functions in the FIG. 1 prior art embodiment as they do in the FIG. 2 embodiment. In the downstream portion of the system illustrated in FIG. 2, however, it should be noted that the gutter 28 is narrowed in comparison to the gutter illustrated in FIG. 1 and that the bipolar deflecting electrode 30 has been replaced by a series of cylindrical electrodes 32–35 which extend along the path of droplet travel. These electrodes 32–35 both deflect negatively charged droplets into the gutter 28 and enhance side to side sweeping action initiated by the scanning electrode 16. FIGS. 3 and 4 illustrate top and elevational views of the FIG. 2 system and in particular show the electrodes 32–35 positioned about the ink droplet path of travel.

Figure 5:
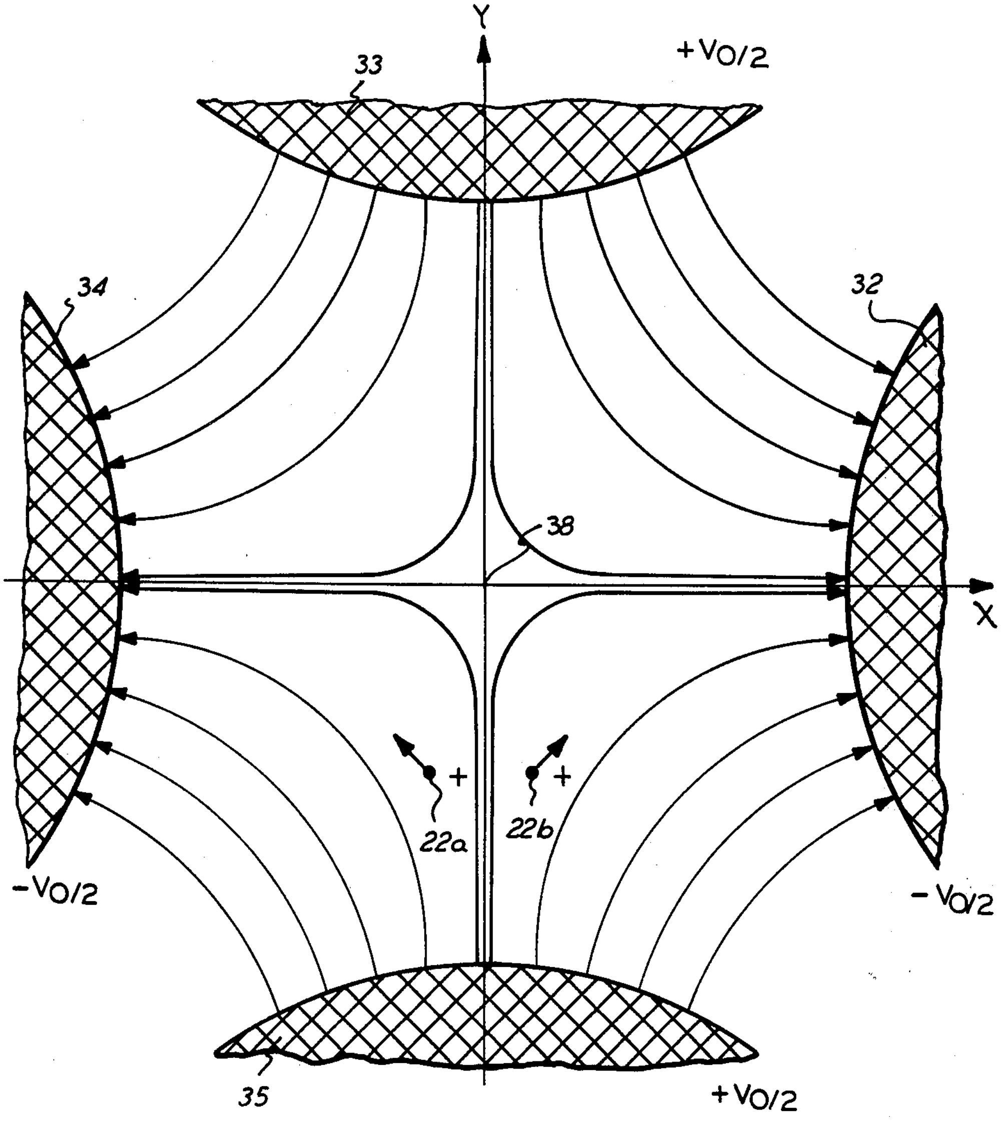
FIGS. 5 through 8 are end views showing the electric field generating electrodes which comprise a portion of the present invention.
Figure 6:
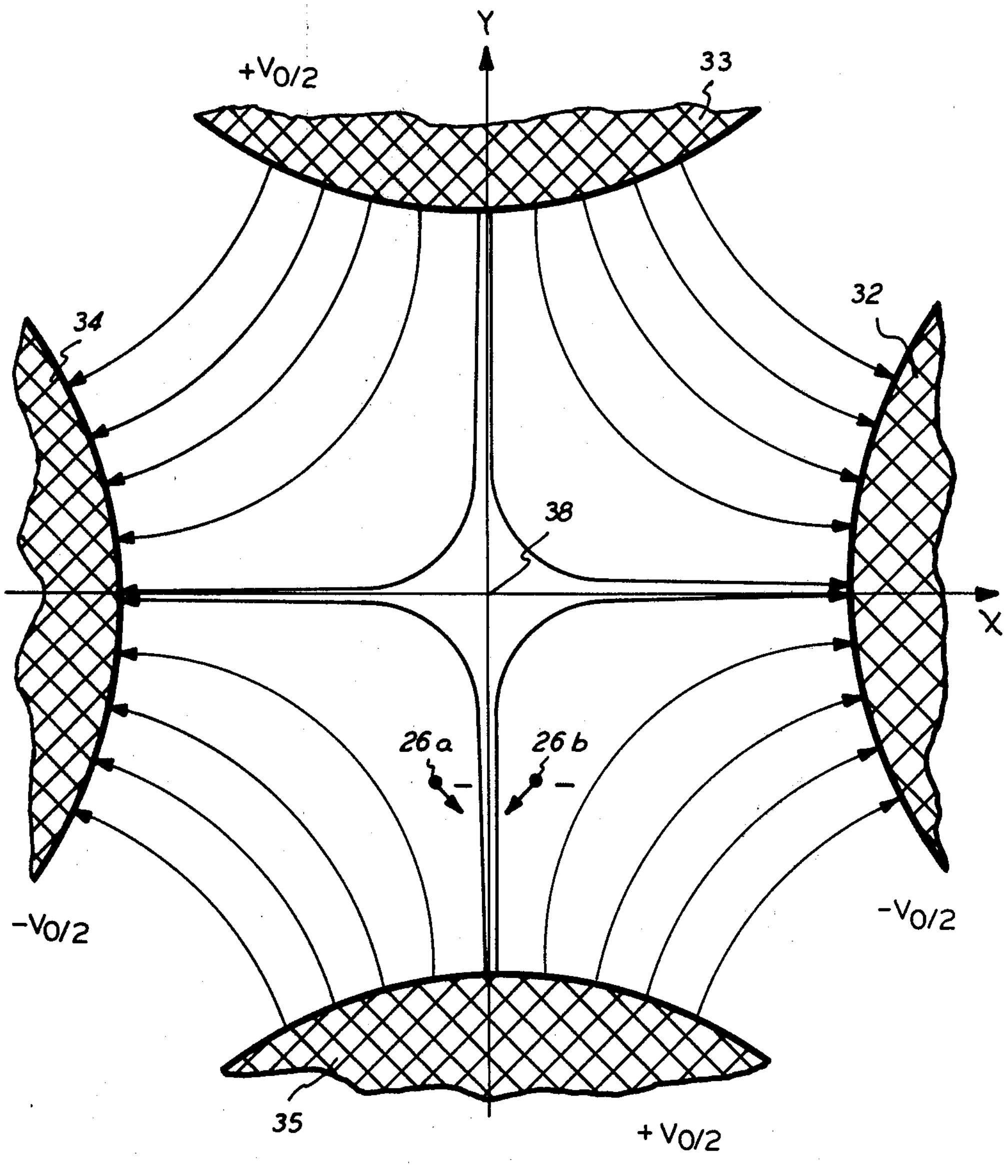

The function the electrodes 32–35 perform is seen most clearly by reference to FIGS. 5 and 6 which illustrate both positively (FIG. 5) and negatively (FIG. 6) charged droplets entering the region circumscribed by the electrodes 32–35. In those figures are defined a coordinate system having a z axis 38 which parallels the electrodes and x and y axes which bisect the electrodes 32–35. The electrodes are energized by electric potentials of opposite polarity as indicated in those figures. The effect of positioning these electrodes about the droplet path of travel is to generate a quadrapole electric field through which the charged droplets must pass in their travel toward the paper plane 24. Lines of force have been added to FIGS. 5 and 6 to help illustrate electrostatic forces experienced by the charged droplets as they enter the region surrounded by the electrodes 32–35.

FIG. 5 shows two positively charged ink droplets 22*a, b* as they enter the third and fourth quadrants surrounded by the electrodes 32–35. The two positively charged droplets are deflected away from the positively energized electrodes towards the negatively energized electrodes in directions paralleling the lines of force. It can be seen that a positively charged particle on the negative side of the y axis will be deflected away from the y axis in the negative x direction. A positively charged droplet on the positive side of the y axis will also be deflected away from the y axis but along the positive x direction. It should be appreciated that both positively charged droplets will be deflected towards the x axis if their entrance points to the field generating electrodes 32–35 are as illustrated in FIG. 5.

In the illustrated configuration, positively charged ink droplets are directed to the paper plane 24. By surrounding the droplet path of travel with the illustrated electric field, the side to side scanning initiated by the scanning electrode 16 can be amplified. A positively charged droplet which has been deflected away from the center line which coincides with the y axis will be further deflected away from that axis by the quadrapole field generated by the electrodes 32–35. In this way, the scanning potential applied to the electrode 16 can be reduced since the full extent of side to side scanning from point P to point P' (FIG. 1) can be caused by the scanning electrode 16 and field generating electrodes 32–35 acting in concert to sweep droplets across the portion of the paper path covered by the nozzle associated with these scan electrodes.

Turning now to FIG. 6 there is illustrated an electric field pattern similar to that illustrated in FIG. 5, but wherein the forces acting on negatively charged droplets is examined. As seen in that figure, negatively charged droplets displaced from the y axis are attracted toward the y axis and deflected away from the x axis. The deflection pattern illustrated in FIG. 6 can be utilized to obviate the necessity for the bipolar electrode 30 illustrated in FIG. 1. The passage of the negatively charged ink droplets through the quadrapole electrodes 32–35 results in each negatively charged droplet being deflected away from the x axis toward the gutter 28. In addition, the width dimension of the gutter 28 can be reduced due to the fact that the negatively charged droplets are focused toward the y axis as they travel between the electrodes 32–35.

In summary, the positively and negatively charged ink droplets are each deflected as they pass through the regions circumscribed by the electrodes 32–35. The positively charged droplets are deflected away from the y axis to amplify scanning effects introduced by the scanning electrode and are focused toward the x axis to make more uniform their appearance across the paper plane. The negatively charged particles are also focused in one direction and defocused or deflected in a second direction. The deflection experienced by the negatively charged particles is used to direct negatively charged droplets to the gutter 28 and the focusing effect tends to direct those negatively charged droplets back to a center line defined by the y axis as seen in FIGS. 5 and 6.

As seen in FIG. 4, the nozzle 14 and generator 10 are configured to direct charged droplets into the third and fourth quadrants as defined by the coordinate system seen in FIGS. 5 and 6 and in particular, those droplets are injected into the region surrounded by the electrodes 32–35 at a point approximately midway between the z axis 38 and the positively energized electrode 35 which is intercepted by the negative y axis. Designing the system to direct droplets to this region insures that the field created by the electrodes 32–35 produces the above described effect. Introduction of charged droplets have the x axis would cause negatively charged droplets to be deflected in a positive y direction away from the x axis and away from the gutter 28.

Shown in FIG. 2 are a pair of drive rollers 40,42 which move a recording medium such as paper 44 or the like along the paper plane 24. This relative movement continues as the generator 10 directs ink droplets to the paper. Due to this relative movement between the paper and the generator a series of sequentially generated droplets from a single scan from point P to P' will appear skewed on the paper.

Figure 7:
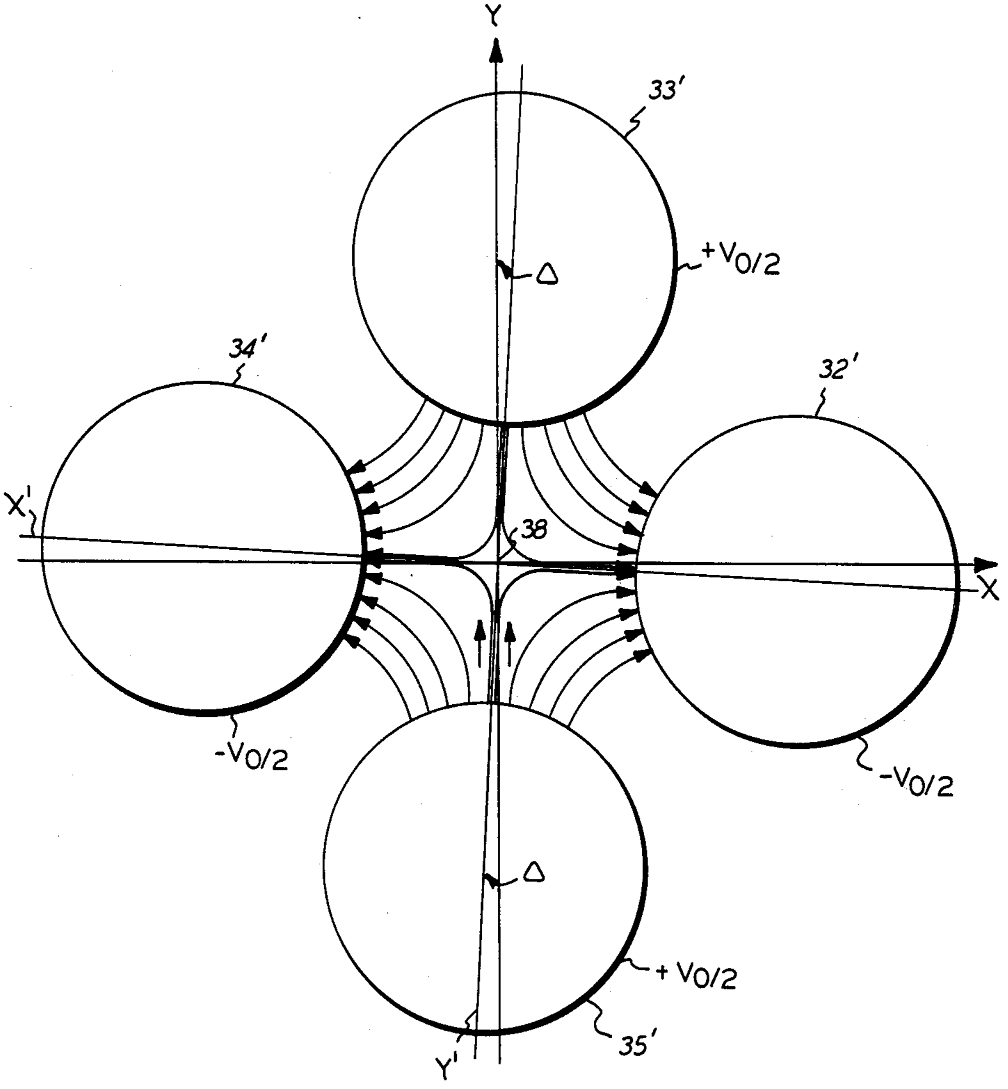

A slight reconfiguration of both the scanning electrode 16 and deflection electrodes 32–35 causes droplets from a single scan to strike the paper along a line parallel to the paper edge. This electrode reconfiguration is shown in FIG. 7 wherein the electrodes 32'–35' surround a z axis 38 of a right hand coordinate system but the electrodes are no longer bisected by the x and y axes. All electrodes have been rotated clockwise an amount Δ with respect to the position shown in FIGS. 5 and 6, and as a result the electric field as depicted by the lines of force has also been rotated.

The two segments comprising scan electrode 16 are also tilted by the amount Δ. This tilting skews the scan line so that droplets enter the region surrounded by the electrodes 32'–35' along the x' axis. The drops *22a, 22b* will be focused and defocused in an analogous manner but due to the rotation of electrodes the droplets will strike the paper along a line which parallels the paper edge rather than along a line skewed with respect to that edge. The proper amount of rotation Δ will depend on the speed of the paper past the generator 10 as well as the drop generation frequency for nozzles comprising the ink jet system.

One should note that in an ink jet system comprising numerous nozzles each nozzle must have its own field generating electrode members. Adjacent negative field generating electrodes can, however, be shared along the width of the generator. Thus, the negative electrode 32 depicted in FIGS. 5 and 6 will serve as a field generating member for an adjacent nozzle in a multi-nozzle ink jet system.

Figure 8:
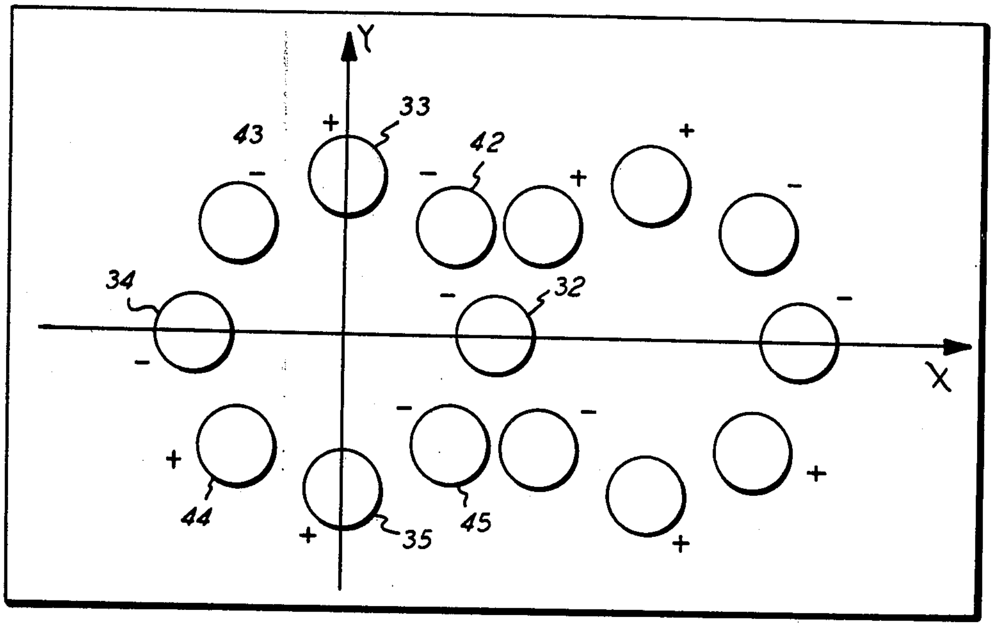

The re-orientation of the electric field accomplished by an actual, physical rotation of the electrodes 32–35 shown in FIG. 7, can also be accomplished by the addition of intermediate electrodes 42–45 such as those depicted in FIG. 8. When energized by voltages of the polarity indicated in that figure, the octapole configuration creates an electric field similar to the electric field generated by the rotated quadrapole configuration (FIG. 7). The size of voltages applied to the intermediate electrodes 42–45 can be varied until a desired electric field configuration is obtained for accurate drop placement. FIG. 8 shows the octapole electrodes for two adjacent nozzles in a multi-nozzle ink jet array and as mentioned above, one electrode 32 is shared by both nozzles.

An ideal electric quadrapole (FIGS. 5 and 6) has hyperbolic shaped electrodes and produces an electric field potential within the structure of the form $$V = \frac{V_0(x^2 - y^2)}{2d^2}$$

where x and y are distances along the coordinate system shown in the figures, d is the distance between the z axis and the electrode surfaces, and $V_0/2$ is the potential applied to the electrodes. Charge drops entering the region experience a focusing force proportional to the displacement from the axis to which it is focused. In the direction of divergence, however, drops are deflected through a greater angle. The angle of divergence is $$\frac{1 + \frac{L}{6f_o}}{1 - \frac{L}{6f_o}}$$

times greater than the angle of convergence, where $$f_o = \frac{mv^2d^2}{qv_oL}$$

and m equals drop mass, v equals drop velocity, q is the charge on a droplet and L equals electrode length along droplet flightpath. Thus, the quadrapole structure amplifies off axis displacements or defocuses the stream of ink droplets better than it corrects for or focuses for displacements in a transverse direction. This phenomenon insures that negative charged droplets reach the gutter 28 and also reduces the scanning requirements placed on the scanning electrode 16.

Since the electrodes 32–35 extend along the droplet flight path, the electric field acts on the drops for an extended time. This extended field/droplet interaction reduces the voltages which must be applied to the quadrapole electrodes. Adequate performance of the illustrated quadrapole electrode configurations have been achieved using electrodes which were 0.012 inches in diameter, extend 0.125 inches along the flight path and are positioned a distance of 0.018 inches from a center axis. When energized with voltage differences on the order of 1000 volts, the quadrapole configuration causes a sweep amplification on the order of 2.5 times greater than the deflection provided by the scan electrode 16. It should be apparent, therefore, that the utilization of these quadrapole electrodes 32–35 in combination with the scan electrode 16 allows the power applied to the scan electrode to be reduced with no diminution in the system scan capability. The maximum sweep achievable by such a system is determined by the point at which droplets strike the quadrapole electrodes 32–35. If necessary, the electrodes can be shortened or tapered to allow a greater exit space and therefore increase side to side scanning for the ink jet system.

Figure 9:
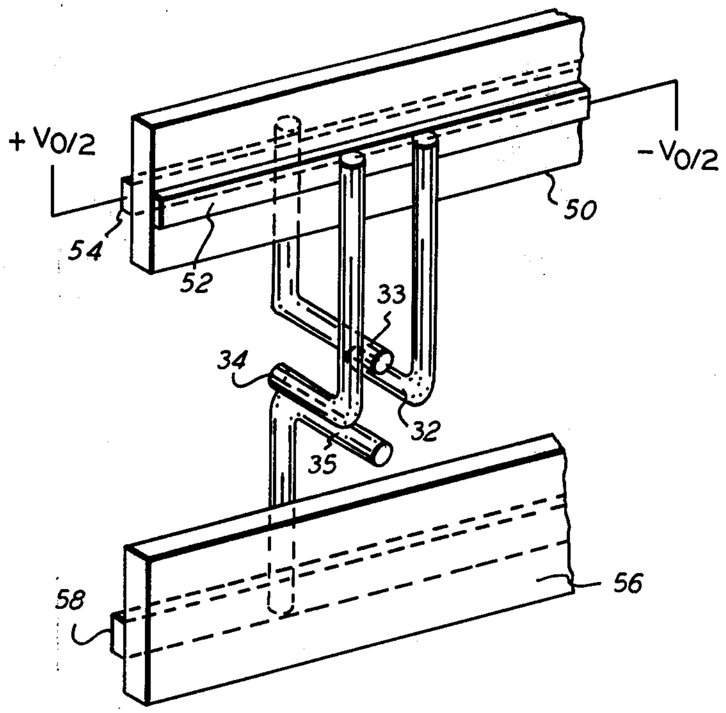
FIG. 9 is a perspective view of a preferred mounting scheme for the electric field generating electrodes.

A preferred mounting scheme for positioning an array of deflecting electrodes about one or more ink jet paths avoids the positioning of electrical contacts to those electrodes in the vicinity of the ink path so as to avoid inadvertent shorting of the electrodes. FIG. 9 illustrates one suitable electrode mounting. In that Figure the electrodes 32–35 comprise L shaped conductors where the short leg of the L is parallel to ink drop travel and the long leg of the L extends away from the droplet path for connection to an external voltage source.

These electrodes 32–34 terminate on a first printed circuit board type insulator 50 having two conductor surfaces 52, 54 plated thereto. The surfaces 52, 54 are in turn connected to voltage sources which provide the necessary $\pm V_o/2$ signals for energizing the electrodes 32–34. Electrical contact between the electrodes and the surfaces 52, 54 is preferrably accomplished by soldering.

A second insulator 56 mounts the fourth electrode 35. A positively energized conductor 58 is coupled to this fourth electrode 35 and supplies the $+V_o/2$ signal to complete the quadrapole field generating configuration.

For multi-nozzle arrays the insulators 50, 56 extend along the array width so that the conductors 52, 54, 58 can bus the $\pm V_o/2$ signals to each electrode along the array. If the octapole arrangement (FIG. 8) is used the addition electrodes 42–45 can similarly be coupled to the conductors with the further addition of a negative bus to the bottom insulator 56.

The ink jet deflection systems have been described with a degree of particularity. It should be appreciated, however, that certain design modifications could be made in the present system and it is the intent that all such modifications falling within the spirit or scope of the present claims be covered by the invention.

I claim:

1. In an ink jet recorder of the type where ink droplets impinge upon a recording medium in a controlled pattern corresponding to information to be recorded, apparatus comprising:

means for generating one or more ink jet columns and directing said columns toward said recording medium, means for deflecting said columns from an initial trajectory prior to the breakup of said columns into discrete droplets, means for charging individual droplets in a binary fashion so that droplets having a first polarity charge can be directed away from said recording medium and droplets having a second polarity charge strike said recording medium, electrode means having at least four electrode elements circumscribing a path of droplet travel and extending a distance along said path of travel and means for interrupting those droplets directed away from said recording medium, said elements in combination positioned to create an electric field when energized by a source of electric potential which deflects droplets with the first polarity charge into said gutter and which deflects droplets having said second polarity charge in the direction of deflection initiated by said means for deflecting.

2. The apparatus of claim 1 wherein said electrode elements are positioned equidistant from a center axis and wherein the means for generating directs said droplets along paths of travel displaced from said axis to insure each droplet is properly deflected by said field.

3. The apparatus of claim 2 wherein the marking medium moves relative to the recorder as drops are generated and wherein said means for deflecting are tilted to cause said columns to sweep across a direction having components both parallel and perpendicular to the direction of medium travel to cause said drops to impinge upon a line perpendicular to medium travel and further wherein said at least four electrodes are rotated about said axis an amount equal to the tilt of said means for deflecting.

4. The apparatus of claim 2 wherein the recording medium moves relative to the recorder as drops are directed to said marking medium and wherein said means for deflecting are tilted to cause said columns to sweep across a direction having components both parallel and perpendicular to the direction of medium travel to cause said drops to impinge upon a line perpendicular to medium travel and wherein eight electrodes are equally spaced about said axis having voltages coupled thereto for rotating said electric field an amount equal to the amount of tilt.

5. In an ink jet recorder of the type where ink from a plurality of nozzles is directed to a record medium, said recorder including scan electrodes for deflecting ink from said nozzles from side to side to allow each of said nozzles to selectively transmit ink droplets to a certain portion of said medium, apparatus comprising:

means for inducing an electric charge on individual ink droplets at a point of droplet breakoff, said means for inducing operative to induce a first polarity charge on droplets to be directed away from the medium and a second opposite polarity charge on droplets directed to said medium; and field generating means positioned downstream from said means for inducing for deflecting droplets with said first polarity charge in a first direction away from said recording medium and for deflecting droplets with said second polarity charge in a second direction substantially perpendicular to said first direction in order to amplify the side to side deflection initiated by said scan electrodes.

6. The ink jet recorder of claim 5 wherein said recorder is of a type having means for moving said record medium past said nozzles at a controlled rate and wherein the field generating means and scan electrode associated with each nozzle cause droplets to strike said medium along a line substantially perpendicular to the direction of movement of said record medium.

7. In an ink jet printer of the type wherein ink under pressure is forced from a plurality of ink jet nozzles toward a moving recording medium, a process for controlling the trajectory of ink forced through said nozzles comprising the steps of:

controllably deflecting ink columns from each of said nozzles to cause said columns to sweep from side to side in a direction transverse to recording medium movement, perturbing said ink to insure said plurality of columns break up into droplets at a specified distance from said nozzles, charging said ink droplets at the point of droplet formation according to a scheme whereby those droplets having a first polarity charge strike said recording medium and those droplets havng a second opposed polarity charge miss said medium and are recirculated for subsequent use by said printer, generating a steady state electric field through which droplets of either charge must pass in their trajectory toward said recording medium such that droplets having said first polarity charge are deflected or defocused in a direction transverse to recording medium movement thereby amplifying the earlier provided controlled deflection, and catching or intercepting droplets with said opposed polarity charge as they are defocused away from said medium by said steady state field.

8. The process of claim 7 wherein the generating step is performed by equally spacing at least four conducting cylindrical electrodes about each path of droplet travel so that said electrodes extend along said path and energizing adjacent electrodes with steady state electric potential of opposite polarity.

9. An ink jet recording apparatus comprising:

means for directing a plurality of ink jet columns along substantially parallel paths toward a printing plane, means for moving a record medium along said printing plane to intercept droplets from said columns along the width of said medium, means for deflecting said columns from side to side prior to the breakup of said columns into ink droplets; each column intercepting a portion of said width, means for charging droplets from said columns at the point of droplet formation so that droplets charged with a first polarity strike said medium and droplets charged with an opposed polarity are intercepted prior to the printing plane, means for generating an electric field intermediate said means for charging and said printing plane to amplify the deflection initiated by said means for deflecting of those droplets charged to said first polarity and to cause said oppositely charged droplets to deflect away from said printing plane, and means for intercepting said oppositely charged droplets.

10. The recording apparatus of claim 9 wherein said means for intercepting comprises a number of gutter members corresponding to the number of said ink jet columns, the width dimension of said gutter members less than the portion of medium width that ink from an associated column scans.

11. The apparatus of claim 9 wherein said means for generating comprises at least four cylindrical conductors mounted to extend along each of said parallel paths, adjacent ones of said conductors being energized to opposite polarity electric potentials.

* * * * *